US011272349B2

(12) United States Patent
Lu et al.

(10) Patent No.: US 11,272,349 B2
(45) Date of Patent: Mar. 8, 2022

(54) DEPLOYMENT, CONFIGURATION AND PROVISION OF SERVICES AND/OR FEATURES FOR AN INBOUND ROAMER

(71) Applicant: VODAFONE GMBH, Duesseldorf (DE)

(72) Inventors: Yang Lu, Duesseldorf (DE); Peter Wild, Krefeld (DE); Juergen Caldenhoven, Duesseldorf (DE)

(73) Assignee: VODAFONE GMBH, Duesseldorf (DE)

( * ) Notice: Subject to any disclaimer, the term of this patent is extended or adjusted under 35 U.S.C. 154(b) by 0 days.

(21) Appl. No.: 16/183,121

(22) Filed: Nov. 7, 2018

(65) Prior Publication Data
US 2019/0149976 A1 May 16, 2019

(30) Foreign Application Priority Data

Nov. 13, 2017 (EP) ..................... 17201341

(51) Int. Cl.
*H04W 8/06* (2009.01)
*H04W 8/20* (2009.01)
(Continued)

(52) U.S. Cl.
CPC ............... *H04W 8/06* (2013.01); *H04W 8/10* (2013.01); *H04W 8/205* (2013.01); *H04W 8/18* (2013.01); *H04W 48/18* (2013.01); *H04W 84/042* (2013.01)

(58) Field of Classification Search
CPC ....... H04W 8/10; H04W 84/042; H04W 8/12; H04W 8/18; H04W 8/26; H04W 8/30; H04W 8/20; H04W 68/12; H04W 8/02
See application file for complete search history.

(56) References Cited

U.S. PATENT DOCUMENTS

| 2007/0202874 A1* | 8/2007 | Shon | H04W 4/06 455/433 |
| 2012/0076082 A1* | 3/2012 | Pison | H04W 12/06 370/329 |

(Continued)

FOREIGN PATENT DOCUMENTS

| WO | WO-2018164824 A1 * | 9/2018 | ............ H04W 36/36 |

OTHER PUBLICATIONS

"3rd Generation Partnership Project; Technical Specification Group Core Network and Terminals; Location management procedures"; 3GPP TS 23.012 V14.0.0; Mar. 2017; Valbonne, France.

*Primary Examiner* — Said M Elnoubi
(74) *Attorney, Agent, or Firm* — Grossman, Tucker, Perreault & Pfleger, PLLC

(57) ABSTRACT

The present invention relates to a method for deployment, configuration and provision of services and/or features for an inbound roamer, wherein an identity information of a first Public Land Mobile Network, to which a mobile equipment of the inbound roamer is subscribed is obtained, the obtained identity information of the first Public Land Mobile Network is provided to the Radio Access Network of a second Public Land Mobile Network, at least one service and/or feature of the second Public Land Mobile Network is configured and provided based on the identity information of the first Public Land Mobile Network to which the mobile equipment of the inbound roamer is subscribed. The present invention further relates to a telecommunications system configured and/or adapted to execute the inventive method.

7 Claims, 1 Drawing Sheet

(51) Int. Cl.
*H04W 8/10* (2009.01)
*H04W 8/18* (2009.01)
*H04W 48/18* (2009.01)
*H04W 84/04* (2009.01)

(56) References Cited

U.S. PATENT DOCUMENTS

| | | | |
|---|---|---|---|
| 2012/0264466 A1* | 10/2012 | Vainola | H04W 48/18 455/500 |
| 2015/0043534 A1 | 2/2015 | Shirota et al. | |
| 2015/0358807 A1 | 12/2015 | Gorey et al. | |

* cited by examiner

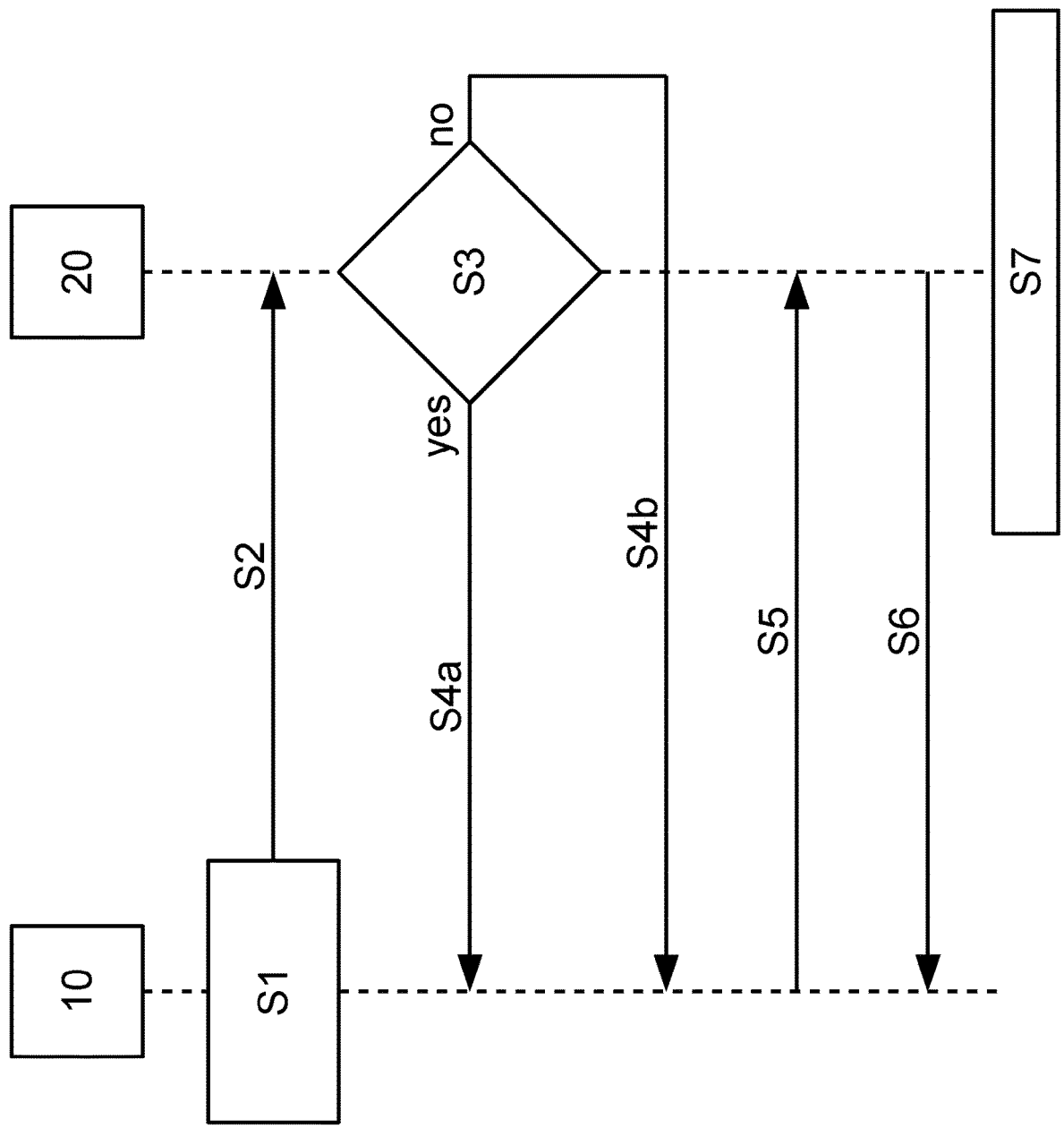

DEPLOYMENT, CONFIGURATION AND PROVISION OF SERVICES AND/OR FEATURES FOR AN INBOUND ROAMER

TECHNICAL FIELD

The present invention relates to a method for deployment, configuration and provision of services and/or features for an inbound roamer. A mobile subscriber on a Public Land Mobile Network (PLMN) to which it is not subscribed (i.e. without a valid subscription) is called inbound roamer for this Public Land Mobile Network. The present invention further relates to a telecommunications system configured and/or adapted to execute the inventive method.

BACKGROUND INFORMATION

In the design of fifth generation (5G) mobile networks, the core network of a mobile network can be deployed in a more flexible way due to application of the so called slicing concept. Slicing enables a higher flexibility of the mobile network since it allows multiple logical networks to be created on top of a common shared physical infrastructure. A network slice is a logical network that provides specific network capabilities/network characteristics and is formed by a set of network functions (NFs) and network resources. Therein a network slice may be comprised of a Radio Access Network (RAN) part and/or a core network part, wherein a mobile equipment or user equipment (UE) can simultaneously be served by one or more network slices. An initial selection of network slices for a UE is performed by an initial registration procedure towards the core network in the responsibility of the Access and Mobility Management Function (AMF). The slicing concept helps to address the cost, efficiency, and flexibility requirements of a mobile network. Particularly, network resource usage, low-latency, high-performance and reduction on investment of a mobile network are optimized.

An Internet of Things (IoT) device can for example be connected to a network that is tailored to very small, infrequent messages. Thereby the device can attach to a single core network slice that handles for instance several water meter devices. Further, a smartphone can attach to a divers set of network slices based on the requested service and/or application such as streaming video, voice calls, internet browsing, chatting and the like. Moreover, a car can also attach to a diverse set of network slices based on the particular requested service/application such as traffic information or car diagnostics.

For instance, a slice of a dedicated core network can be easily implemented in the whole network to serve a user equipment in a roaming state which may also be referred to as an inbound roamer. However, a problem exists in that the RAN is not able to determine whether the roaming UE, which is camping on the RAN, is an inbound roamer or not. Hence, the RAN cannot route the requests sent from the inbound roamer to the dedicated core network components without delay respectively in a quick manner.

If a RAN of a mobile network operator (MNO) is for example shared by a certain subscriber group, it is desirable that each subscriber of this subscriber group can be immediately routed to the core network components that are only provided for this particular subscriber group as soon as the subscribers of this subscriber group camp on the RAN of the MNO's mobile network. This would provide a way to promptly serve the subscribers of the subscriber group and efficiently utilize the MNO's network resources without any pre-configurations in the subscriber's UE.

According to an approach known from the prior art, a so called Single Network Slice Selection Assistance Information (S-NSSAI) serves to identify a network slice and comprises the parameters of a slice/service type (SST) and a slice differentiator (SD). The S-NSSAI can either hold default values or values specific to a certain Public Land Mobile Network (Public Land Mobile Network). For example, an SST value of 1 characterizes slices which are suitable for the handling of 5G enhanced mobile broadband which are particularly useful for general consumer space mobile broadband applications such as streaming of high quality video, fast large file transfers and the like. In contrast to that, an SST value of 2 characterizes a support of ultra-reliable low latency communications (URLLC) particularly for applications in industrial automation, (remote) control systems and the like. Furthermore, an SST value of 3 is characteristic for massive Internet of Things (MIoT) applications which allow the support of a large number and a high density of IoT devices in an efficient and cost-saving way.

However, the SST value as well as the SD value from an inbound roamer does not contain any information about the network to which the inbound roamer is subscribed. Therefore, upon receiving an access request from an inbound roamer, the visited 5G RAN is unable to instantly identify the appropriate core networks which could provide the proper services to the inbound roamer.

SUMMARY

The aforementioned drawbacks are solved by an inventive method for deployment, configuration and provision of services and/or features for an inbound roamer, wherein an identity information of a first Public Land Mobile Network, Public Land Mobile Network, to which a mobile equipment of the inbound roamer is subscribed is obtained, the obtained identity information of the first Public Land Mobile Network is provided to the Radio Access Network of a second Public Land Mobile Network, at least one service and/or feature of the second Public Land Mobile Network is configured and provided based on the identity information of the first Public Land Mobile Network to which the mobile equipment of the inbound roamer is subscribed.

This approach enables a configuration of services and/or features in a Visited Public Land Mobile Network for a user equipment being attached to a Radio Access Network of the Visited Public Land Mobile Network. Hence, the services which a user equipment uses in its Home Public Land Mobile Network can also be provided for the user equipment in a Visited Public Land Mobile Network. In this case, the identity information is an identity information of the Home Public Land Mobile Network to which the user equipment is normally subscribed.

The inventive solution is based on the knowledge that a RAN of a Visited Public Land Mobile Network is unable to know whether or not a subscriber, which is camping on the RAN, is an inbound roamer. Hence, requests from such a subscriber cannot be routed from the inbound roamer to the dedicated parts of the core network quickly. It has been recognized, in order to facilitate such a procedure, that an identification of inbound roamers is essential.

Advantageously at least one service and/or feature of the Radio Access Network of the second Public Land Mobile Network is configured and provided based on the identity information of the first Public Land Mobile Network to which the mobile equipment of the inbound roamer is subscribed.

According to a preferred embodiment of the invention the identity information of the first Public Land Mobile Network is provided to the Radio Access Network of the second Public Land Mobile Network by the mobile equipment of the inbound roamer during an attempt of the mobile equipment to camp on the Radio Access Network of the second Public Land Mobile Network. This has the advantage that an automatic supply of identity information of the inbound roamer's mobile equipment can be facilitated without the need of sending an additional request from the second Public Land Mobile Network as the Visited Public Land Mobile Network to each mobile equipment which attempts to camp on its RAN.

In another preferred embodiment of the invention it is provided that the identity information of the first Public Land Mobile Network is provided to the Radio Access Network of the second Public Land Mobile Network after a Radio Connection Request has been carried out by the mobile equipment. This is particularly advantageous since information is sent from a mobile equipment to the RAN during a Radio Connection Request anyway. Hence, further information about the identity of the mobile equipment of the inbound roamer can be transferred to the RAN therewith without the need for a separate data transmission.

The identity information of the first Public Land Mobile Network is advantageously provided to the Radio Access Network of the second Public Land Mobile Network by sending an information query from the Radio Access Network to the first Public Land Mobile Network to which the mobile equipment is subscribed and sending back an information response from the first Public Land Mobile Network to the Radio Access Network of the second Public Land Mobile Network containing the identity of the first Public Land Mobile Network according to an alternative preferred embodiment of the present invention. This has the advantage that changes would only need to be implemented on the RAN side whereas no changes for the mobile equipment of an inbound roamer would be required. Furthermore, if the mobile equipment does not automatically transmit any identity information to the RAN, this approach could serve as a fallback solution.

Hence, according to another advantageous embodiment of the invention the information query is sent from the Radio Access Network of the second Public Land Mobile Network to the first Public Land Mobile Network if no identity information of the first Public Land Mobile Network has been provided from the mobile equipment to the Radio Access Network of the second Public Land Mobile Network after a Radio Connection Request.

The identity information of the first Public Land Mobile Network preferably consists of a Mobile Country Code, MCC, and a Mobile Network Code, MNC. Since the MCC and the MNC are part of a subscriber's International Mobile Subscriber Identity, IMSI, this information can be easily accessed and provided to the visited RAN.

Another preferred embodiment of the invention provides that the identity information of the first Public Land Mobile Network is an identifier that identifies an organization to which the mobile equipment is subscribed. This approach serves as an alternative to providing MCC/MNC and is particularly advantageous for scenarios in which a Mobile Virtual Network Operator, MVNO, uses components of an operator's mobile network. Based on the provided identity information, corresponding parts of the core network can be selected and/or certain features of the RAN can be disabled.

The present invention further relates to a telecommunications system configured and/or adapted to execute the inventive method.

BRIEF DESCRIPTION OF THE DRAWINGS

The aforementioned and other aspects of the invention will be apparent from and elucidated with reference to the embodiments described hereinafter making reference to the accompanying drawings.

These and other features and advantages will be better understood by reading the following detailed description, taken together with the drawing wherein:

FIG. 1 depicts a schematic flow diagram of an embodiment of the method in which a UE attempts to camp on a visited Public Land Mobile Network.

DETAILED DESCRIPTION

In FIG. 1 a schematic flow diagram is depicted which illustrates the inventive method. In method step S1 a mobile equipment respectively user equipment 10 which is subscribed to a first Home Public Land Mobile Network attempts to camp on a second Visited Public Land Mobile Network. For this purpose, a Radio Connection Request is sent from the user equipment 10 to the Radio Access Network 20 of the second Visited Public Land Mobile Network in step S2.

In subsequent step S3 the Radio Access Network 20 evaluates the received Radio Connection Request which has been sent in step S2 and checks whether an identity information of the first Home Public Land Mobile Network has been provided by the user equipment 10.

If an identity information has been provided by the user equipment 10, a Radio Connection Response is sent back from the Radio Access Network 20 of the second visited Public Land Mobile Network to the user equipment 10 in step S4a.

On the other hand, if no information identity of the first Home Public Land Mobile Network has been provided by the user equipment 10, the method continues with step S4b in which an Home Public Land Mobile Network information query is sent from the Radio Access Network 20 of the second visited Public Land Mobile Network to the user equipment 10 in order to request information about the user equipment's Home Public Land Mobile Network.

Accordingly, a Home Public Land Mobile Network information response is sent from the user equipment 10 to the Radio Access Network 20 of the second Visited Public Land Mobile Network which contains information about the Home Public Land Mobile Network in step S5. This information response may contain MCC and MNC of the Home Public Land Mobile Network or may comprise another identifier that identifies an organization to which the mobile equipment is subscribed. In step S6, a Radio Connection Response is sent from the Radio Access Network 20 of the second Visited Public Land Mobile Network to the user equipment 10 for this case.

The inventive method ends up with step S7 in which, either after the identity information of the Home Public Land Mobile Network to which the user equipment 10 is subscribed has been provided by the user equipment 10 automatically or was requested by the Radio Access Network 20 of the second Visited Public Land Mobile Network, based on the provided identity of the Home Public Land Mobile Network the Radio Access Network 20 acts accordingly and may select corresponding core network parts or disables certain features of the Radio Access Network 20 or the like base on the given identity information.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

REFERENCE SIGNS

10 User equipment/mobile equipment
20 Radio Access Network
S1 Attempt to camp on a Visited PLMN
S2 Radio Connection Request
S3 Check if HPLMN identity information was provided
S4a Radio Connection Response
S4b Home PLMN information query
S5 Home PLMN information response
S6 Radio Connection Response
S7 Deployment, configuration and provision of services and/or features for inbound roamer in Visited PLMN

What is claimed is:

1. A method being executed in a telecommunication system comprising at least a Radio Access Network according to the fifth generation (5G) and a mobile equipment for deployment, configuration and provision of services and/or features for an inbound roamer, comprising:
    obtaining, by the mobile equipment, an identity information of a first Public Land Mobile Network, to which a mobile equipment of the inbound roamer is subscribed;
    providing, by the mobile equipment, the obtained identity information of the first Public Land Mobile Network to the Radio Access Network of a second Public Land Mobile Network during an attempt of the mobile equipment to camp on the Radio Access Network of the second Public Land Mobile Network when a Radio Connection Request is carried out by the mobile equipment, wherein further information about an identity of the mobile equipment of an inbound roamer is transferred to the Radio Access Network of the second Public Land Mobile Network therewith without a need for a separate data transmission; and
    configuring, by the Radio Access Network of the second Public Land Mobile Network, at least one service and/or feature of the second Public Land Mobile Network based on the obtained identity information of the first Public Land Mobile Network to which the mobile equipment of the inbound roamer is subscribed.

2. The method according to claim 1, wherein at least one service and/or feature of the Radio Access Network of the second Public Land Mobile Network is configured and provided based on the identity information of the first Public Land Mobile Network to which the mobile equipment of the inbound roamer is subscribed.

3. The method according to claim 1, wherein an information query is sent to the mobile equipment if no identity information of the first Public Land Mobile Network has been provided from the mobile equipment to the Radio Access Network of the second Public Land Mobile Network after the Radio Connection Request.

4. The method according to claim 1, wherein the identity information of the first Public Land Mobile Network consists of a Mobile Country Code, MCC, and a Mobile Network Code, MNC.

5. The method according to claim 1, wherein the identity information of the first Public Land Mobile Network is an identifier that identifies an organization to which the mobile equipment is subscribed.

6. A method being executed in a telecommunication system comprising at least a Radio Access Network according to the fifth generation (5G) comprising:
    obtaining, by a mobile equipment, an identity information of a first Public Land Mobile Network to which the mobile equipment is subscribed;
    providing, by the mobile equipment, a Radio Connection Request to a Radio Access Network of a second Public Land Mobile Network;
    providing, by the mobile equipment, the obtained identity information of the first Public Land Mobile Network to the Radio Access Network of a second Public Land Mobile Network during an attempt of the mobile equipment to camp on the Radio Access Network of the second Public Land Mobile Network when a Radio Connection Request is carried out by the mobile equipment, wherein further information about an identity of the mobile equipment of an inbound roamer is transferred to the Radio Access Network of the second Public Land Mobile Network therewith without a need for a separate data transmission; and
    wherein the identity information provided by the mobile equipment to the Radio Access Network of the second Public Land Mobile Network is configured to cause the Radio Access Network of the second Public Land Mobile Network to configure at least one service and/or feature of the second Public Land Mobile Network based on the obtained identity information of the first Public Land Mobile Network to which the mobile equipment is subscribed.

7. A telecommunication system comprising:
    a Radio Access Network of a Public Land Mobile Network configured to:
    receive a Radio Connection Request from a mobile equipment;
    receive, from the mobile equipment, an identity information of a first Public Land Mobile Network to which the mobile equipment is subscribed during an attempt of the mobile equipment to camp on a Radio Access Network of a second Public Land Mobile Network when the Radio Connection Request is carried out by the mobile equipment, wherein further information about an identity of the mobile equipment of an inbound roamer is transferred to the Radio Access Network therewith without a need for a separate data transmission;
    and
    cause the Radio Access Network of the second Public Land Mobile Network to configure at least one service and/or feature of the second Public Land Mobile Network based on the received identity information of the first Public Land Mobile Network to which the mobile equipment is subscribed.

* * * * *